June 16, 1931. A. P. KNIGHT 1,810,614
APPARATUS FOR ELECTRICAL SEPARATION OF SUSPENDED MATERIAL FROM GASES
Filed Sept. 11, 1929 3 Sheets-Sheet 1

INVENTOR.
Arthur P. Knight
BY Arthur P. Knight & Alfred W. Knight
ATTORNEYS

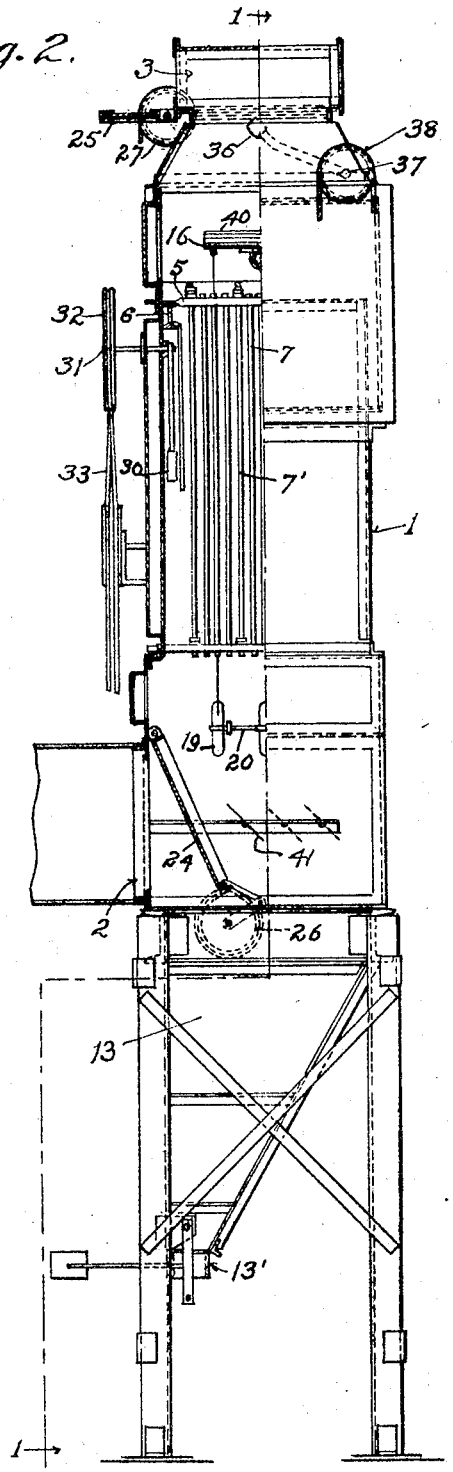

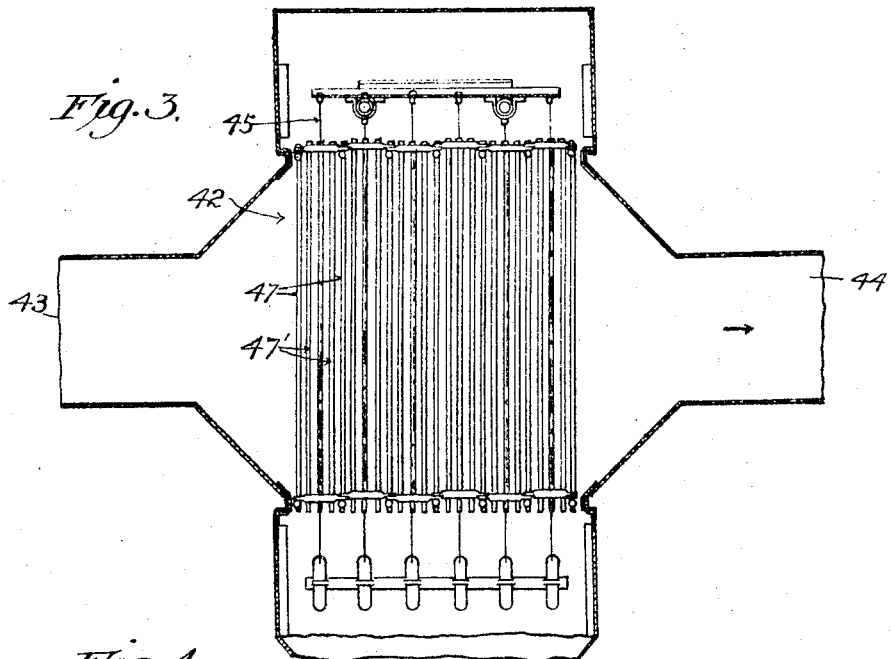
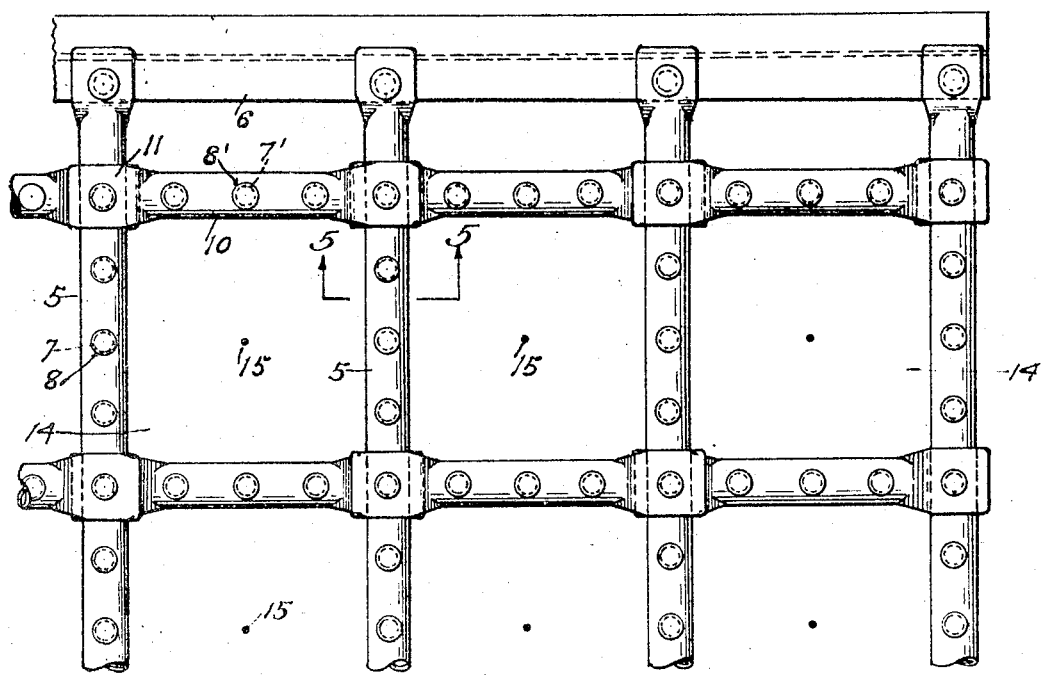
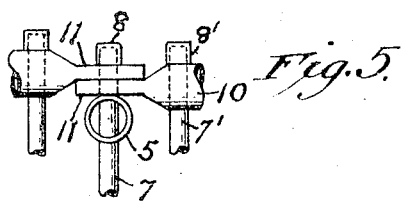

Patented June 16, 1931

1,810,614

UNITED STATES PATENT OFFICE

ARTHUR P. KNIGHT, OF GLENDALE, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR ELECTRICAL SEPARATION OF SUSPENDED MATERIAL FROM GASES

Application filed September 11, 1929. Serial No. 391,871.

This invention relates to an apparatus for electrical separation of suspended material from gases and the main object of the invention is to provide an electrical precipitating apparatus which will be of maximum efficiency and capacity and of relatively low cost. A further object of the invention is to provide electrical precipating apparatus which will present maximum area of effective collecting electrode surface in a given space and at the same time present certain advantages by reason of the special construction of the collecting electrodes as hereinafter set forth.

It has been found desirable and advantageous in certain cases to use collecting electrodes of the so-called rod curtain type as disclosed in Patent No. 1,444,997, dated February 13, 1923, in which each collecting electrode consists of a multiplicity of rods or members spaced sufficiently close together to produce substantially the effect of a continuous collecting surface as regards the effect on the electrical field, while at the same time providing certain advantages in the way of lightness, freedom from warping under changes of temperature and adaptability for jarring to remove collected material therefrom. The present invention is directed particularly to adapting this rod curtain construction in such manner as to provide maximum electrode surface in a given space. For this purpose I provide assemblages of rods arranged in rows, such rows intersecting so as to divide the precipitator space into compartments, discharge electrodes being provided in the respective compartments so formed.

Means are provided for conducting the gas to be treated in contact with the discharge and collecting electrodes and such means may provide for passing the gases longitudinally in the compartments parallel to the rods of which the collecting electrodes are composed or may provide for passing the gases transversely to said rods as hereinafter explained.

The accompanying drawings illustrate embodiments of my invention and referring thereto:

Fig. 2 is a side elevation of a precipitator partly in section on line 2—2 in Fig. 1.

Fig. 3 is a longitudinal section of a form of the invention in which the gases are passed horizontally through and between the vertically extending rod curtain electrodes.

Fig. 4 is a section on line 4—4 in Fig. 2.

Fig. 5 is a section on line 5—5 in Fig. 4.

Figure 1:
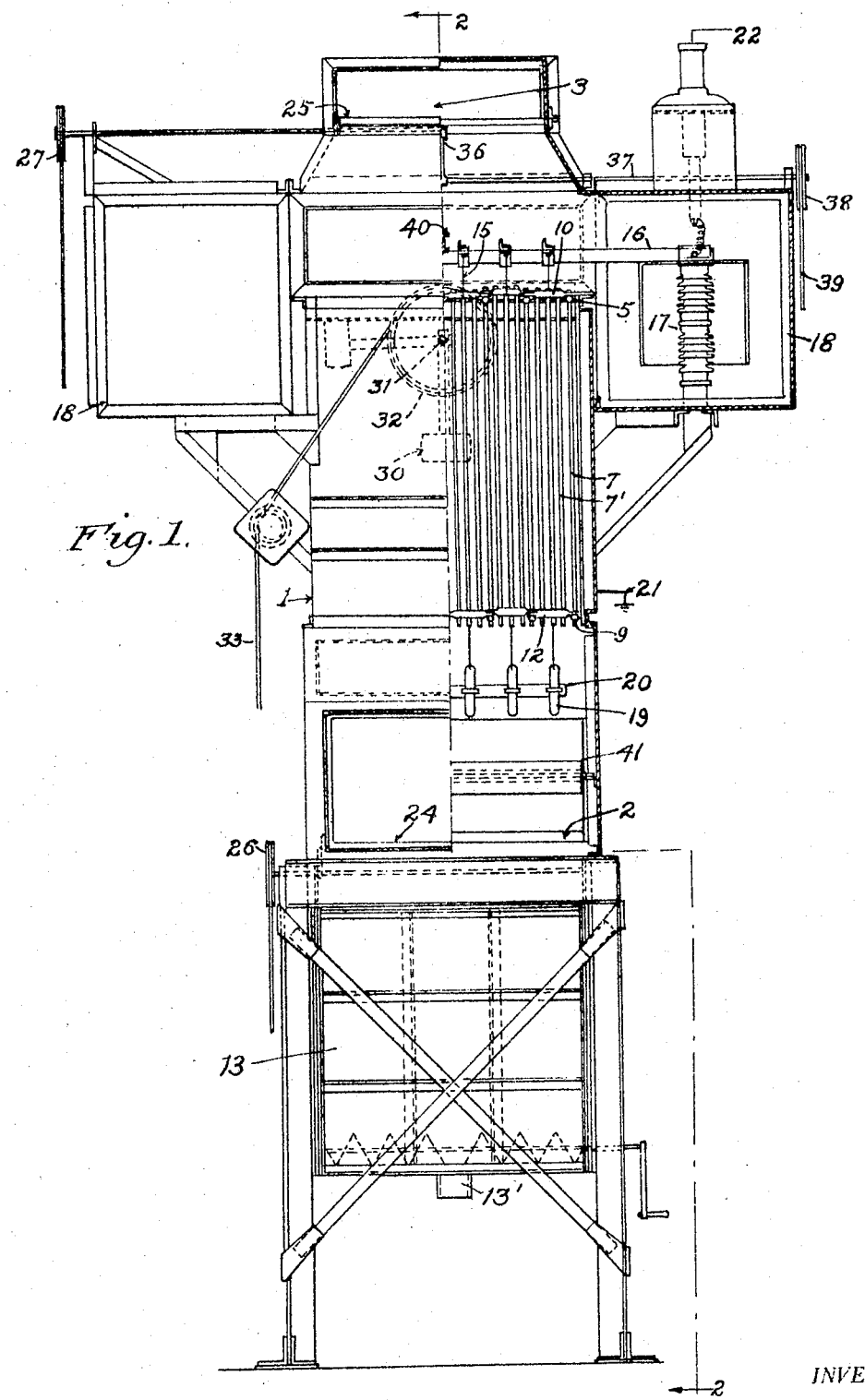
Fig. 1 is an end elevation of a precipitator partly in section on line 1—1 in Fig. 2.

In the form of my invention illustrated in Figs. 1 and 2, the precipitator is shown as comprising a casing 1 forming a precipitator chamber through which the gases to be treated are passed, said casing being provided with an inlet opening 2 and an outlet opening 3. The inlet opening is connected to a flue 4 for supplying the gases to be treated and shown as below the precipitator chamber and the outlet opening above the precipitator chamber so as to provide for upflow of gases through the precipitator chamber, but it will be understood that this arrangement may be reversed so as to provide for downflow through the precipitator chambers. Horizontal bars or tubes 5 are mounted on fixed supports 6 above the precipitator chamber and within the casing 1 and a series or row of collecting electrode rods 7 is mounted on each bar 5, said rods 7 being provided with heads 8 resting on members 5, (as shown in Figs. 4 and 5) the rods extending through holes in members 5 and extending also through holes in cross bars 9 extending across and within the casing 1 below the precipitator chamber.

Transverse supporting members 10 formed as bars or tubes are shown as mounted on the bars or member 5, said members 10 being for example provided with flattened end portions 11 superimposed over the member 5 as shown in Fig. 5 and held in position by one of the collecting electrode rods 7 passing through parts 11 and through the member 5. Members 12 similar to member 10 may be provided between the cross bars 9 below the precipitator chamber, being mounted thereon in similar manner. A number of rows or series of collecting electrode rods 7' are mounted on these transverse members 10 and 12, said members 7' being provided with heads 8' resting on the respective member 10.

The described construction provides a series of rows of collecting electrode rods or members 7 extending vertically and parallel to one another, and a series of rows of collecting electrode rods 7' extending vertically and transversely to the rows 7 so as to divide the precipitator chamber or space into a multiplicity of vertical compartments or flues 14 so that for a given precipitator space and a given spacing of the collecting electrodes the total area of the effective collecting electrode surface is substantially doubled as compared with a construction in which the transverse rows of electrodes are omitted. It will be understood that the rods or members 7 and 7' are spaced sufficiently close together so that their combined effect on the electrostatic fields within the precipitator chamber is substantially the same as that which would result from a continuous metallic conductive surface so as to prevent these elements of the collecting electrodes acting effectively as discharge electrodes. For this purpose as well as to increase the stiffness and stability of the collecting electrode construction, it is preferred to make the collecting electrode members 7 or 7' as rods, bars or tubes of, for example, from ¼ inch to 1 inch diameter and in order to minimize the discharge effect from supporting bars 5, 9, 10 and 12, these members are also preferably formed as rounded bars or tubes. In order that the rows of collecting electrode members shall produce substantially the effect of a continuous conductive surface as regards the distribution of the electrical field, it is necessary that these members be so closely spaced that a plurality of collecting electrode members is presented at each side of each compartment into which the precipitation chamber is subdivided as above described.

The discharge electrode system may be of any suitable construction consisting, for example, of metallic wires, rods or chains 1f suspended from a frame 16 mounted on insulators 17 contained in insulator boxes 18 at the respective sides of the precipitator chamber, said discharge electrode wires being tensioned at their lower ends by weights 19 and spaced by a frame 20 hung on said weights. Instead of wires any other suitable discharge electrode elements, such as rods or chains, may be used provided they present surfaces of sufficient convexity to insure the requisite amount of corona or silent discharge therefrom under the operating potential difference of the apparatus.

Means such as a bin or hopper 13, having a discharge gate 13' at its bottom, is provided below the precipitating chamber to receive and collect the material precipitated in the electrodes and falling therefrom in the operation of the apparatus.

The collecting electrode system may be grounded in the usual manner as indicated at 21 and the discharge electrode system above described may be connected by an electrical connection indicated at 22 to any suitable source of high tension electrical current, for example, rectified alternating current, such as to maintain a unidirectional potential difference of say about 50,000 volts more or less and so as to maintain in the operation of the apparatus an electrical field between the discharge and collecting electrodes aforesaid of sufficient intensity to produce silent or corona discharge from the discharge electrodes with a minimum of electrical discharge from the collecting electrodes.

Suitable damper means 24 and 25 may be provided at the inlet and outlet of the precipitator casing as shown so as to control the flow of gas through the precipitator chamber, said damper means being controlled or operated by means indicated at 26 and 27 respectively.

Means are preferably provided for agitating or jarring the electrodes 7 and 7' so as to dislodge therefrom material deposited thereon by the action of the electrical field. For this purpose hammer means indicated at 30 may be mounted to swing on a shaft 31 carrying a pulley 32 operated by a chain or cable 33 so as to cause the hammer means 30 to swing upwardly in either direction into contact with the bottom of the supporting beam 6 aforesaid in such manner as to impart a blow thereto sufficient to jar the collecting electrode system.

Jarring or agitating means may also be provided for the discharge electrode system consisting, for example, of hammer means 36 carried by a shaft 37 which also carries a pulley 38 adapted to be operated by a cable or chain 39 to cause said hammer means to swing down into contact with an anvil 40 on the supporting frame 16 for the discharge electrodes. Normally the hammer means 36 is held in elevated position as shown in dotted lines in Fig. 1 so as not to interfere with the installation of the discharge electrode system and it will be understood that before said hammer means is brought into operation, suitable switching means, not shown, will be operated to disconnect the discharge electrode system from the source of supply and the hammer means 36 which is mounted on the precipitator casing and is, therefore, grounded, may then be operated to jar the discharge electrode system.

Distribution dampers 41 may be provided adjacent to inlet damper 24 to insure uniform distribution of the gas.

In the operation of the apparatus above described the gases are passed, for example, upwardly through the precipitator chamber which is subdivided by the two transversely extending sets of rows of discharge electrode elements into a multiplicity of vertically extending flues, the gas being subjected to the electrical fields maintained between each discharge electrode 15 and the collecting electrode members surrounding such discharge electrode on all sides. The described construction, therefore, produces substantially the effect of a multiple pipe construction as regards the amount of collecting electrode area exposed while at the same time presenting the advantages of the "rod curtain" type precipitator. One of the advantages of this type of collecting electrodes as compared with the construction in which the collecting electrodes consist of metal sheets or plates is that the collecting electrode elements 7 and 7' are capable of independent vibration so that they may be jarred or vibrated much more readily and effectively than would be the case with a multiplicity of pipes rigidly connected together.

Instead of passing the gases to be treated vertically between the discharge and collecting electrode means, such gases may be passed transversely to the discharge and collecting electrode means. For example, as shown in Fig. 3 the precipitator chamber, indicated at 42, may be provided with an inlet 43 and outlet 44 adapted to pass the gases horizontally through said chamber and the collecting electrodes 47 and 47' and discharge electrodes 45 may be hung vertically in said chamber in substantially the manner above described for the electrodes 7, 7' and 15 above described. In this form of the invention the collecting electrode elements may be mounted in two sets of rows of rods or tubes 47 and 47' extending transversely to one another in the same manner as above described and the discharge electrode means 45 may be mounted so as to extend respectively within the vertical compartments into which the precipitator chamber is subdivided by the transverse sets of collecting electrodes aforesaid, and the construction may be otherwise as above described, suitable means being provided, for example as above described, for jarring the electrodes for removal of the collected material and for supply of electrical high tension current to the electrodes. With the construction shown in Fig. 3, the gas to be treated flows horizontally past the electrodes 47 and 47', the path of the gas stream being parallel to the rows of electrodes 47' and transverse to the rows of electrodes 47, giving the general effect of a so-called "plate-treater" but with increased effective area due to presence of both sets of rows of electrodes.

The above described construction subdivides the precipitator chamber into a multiplicity of vertical compartments extending side by side in contiguous relation and occupying the whole of said chamber, each such compartment being defined and surrounded by collecting electrode means comprising at each side of each such compartment a plurality of separate suspended vertical members capable of independent vibration but spaced sufficiently close together to produce substantially the effect of a continuous surface as regards the electrical field.

I claim:

1. An electrical precipitator comprising a precipitating chamber, means for passing gas to be treated through said chamber, collecting electrode means mounted in said chamber and comprising two sets of rows of collecting electrode members, the rows of one set extending transversely to the rows of the other set so as to subdivide the space within the precipitating chamber into a plurality of compartments, there being a plurality of collecting electrode members at each side of such compartment, and discharge electrode members mounted and insulated within said chamber and extending within the respective compartments aforesaid.

2. An electrical precipitator comprising a casing forming a precipitator chamber and provided with inlet and outlet means for the gas to be treated, and with means below said chamber for collection of the precipitated material, a plurality of collecting electrode members extending vertically within said chamber and parallel to one another, a plurality of rows of collecting electrode members extending vertically within said chamber parallel to one another and transverse to the first named rows of collecting electrode members so as to subdivide the precipitator chamber into a plurality of compartments, there being a plurality of collecting electrode members at each side of such compartments, and discharge electrode members mounted within the said casing and extending in the spaces between the aforesaid transversely extending rows of collecting electrode members.

3. A construction as set forth in claim 2 and comprising, in addition, means for mounting said electrode members so as to be capable of independent vibration and means for jarring said collecting electrode members.

4. An electrical precipitator comprising a precipitator chamber, collecting electrode means mounted in said chamber and including suspended vertical members mounted in rows in such manner as to subdivide the precipitator chamber into a multiplicity of vertical compartments in contiguous relation, each compartment being defined and surrounded by a plurality of separate collecting electrode members spaced sufficiently close together to produce substantially the effect of a continuous surface as regards the electrical field.

In testimony whereof I have hereunto subscribed my name this 3rd day of September, 1929.

ARTHUR P. KNIGHT.